Feb. 18, 1958     A. C. QUAVE     2,823,715
EGG CRACKING DEVICE
Filed Jan. 6, 1954
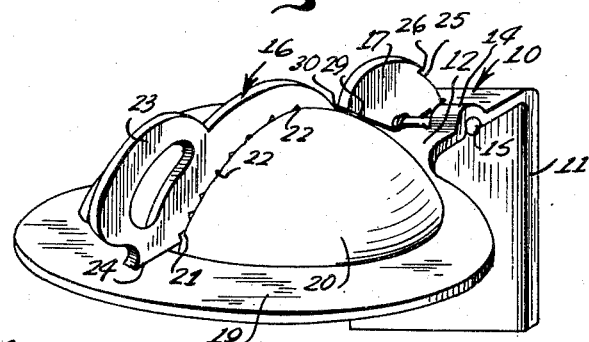
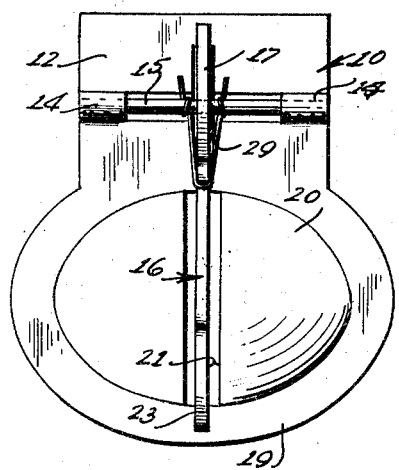
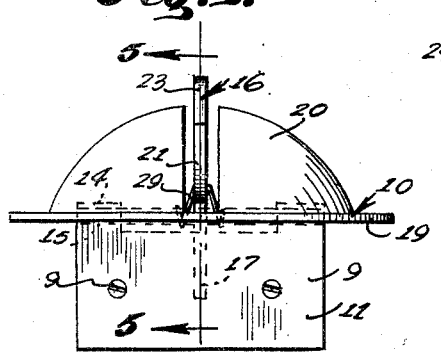
INVENTOR.
Andrew Carlos Quave
BY *Victor J. Evans & Co.*
ATTORNEYS

United States Patent Office 2,823,715
Patented Feb. 18, 1958

2,823,715

EGG CRACKING DEVICE

Andrew Carlos Quave, Pensacola, Fla., assignor of one-half to R. C. Saunders

Application January 6, 1954, Serial No. 402,553

2 Claims. (Cl. 146—2)

This invention relates to a device for use in cracking eggs.

The object of the invention is to provide a device which will facilitate the cracking of eggs, as for example in a kitchen or other locality.

Another object of the invention is to provide an egg cracking device which can be permanently attached in a convenient location in a kitchen or other location, the device of the present invention being easy to clean and being of simple, sanitary and attractive design.

A further object of the invention is to provide an egg cracking device which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the egg cracking device, constructed according to the present invention.

Figure 2 is a top plan view of the device.

Figure 3 is an end elevational view of the device.

Figure 4 is a side elevational view of the device, with the blade in raised position.

Figure 5 is a sectional view taken on the line 5—5 of Figure 3.

Referring in detail to the drawings, the numeral 10 designates a body member that can be made of any suitable material, and the body member 10 is shaped to include a vertically disposed base 11 that is adapted to be secured to any suitable supporting structure, such as a wall 13 by suitable securing elements such as screws 9. Extending from the upper portion of the base 11 and formed integral therewith or secured thereto is a horizontally disposed flange 12, and portions of the flange 12 are struck-up to define bearings 14 for receiving therein a pin 15.

The egg cracking device of the present invention further includes a swingable blade or cracking member 16 which includes a support portion 17, Figure 5. The support portion 17 is provided with a circular opening 18 through which projects the pin 15 whereby a swingable or pivotal connection for the blade 16 is provided.

The flange 12 terminates in an annular lip 19, and positioned inwardly of the lip 19 and secured thereto or formed integral therewith is an arcuate egg shaped socket member 20 which is adapted to receive the egg being cracked. The socket member 20 is provided with a slot 21 through which the blade 16 is adapted to extend, and the blade 16 is provided with a plurality of teeth 22 which project beyond the inner edge of the socket member 20 when the blade is in lowered or cracking position as shown in Figure 5. A handle 23 is formed integral with the blade or secured thereto for swinging the latter.

The front end of the blade 16 is shaped to provide a shoulder 24 which is adapted to abut a portion of the lip 19 so as to limit downward movement of the blade. The rear portion of the blade 16 is provided with a cutout 25 which defines a pair of opposed spaced apart shoulders 26 and 27, and the shoulders 26 and 27 are adapted to engage a projection 28 on the body member whereby swinging movement of the blade 16 will be limited. A spring member 29 is arranged in engagement with a notch 30 on the blade 16, and the spring member 29 is connected to the pin 15 so that when manual pressure is released on the blade 16, the spring member 29 will cause the blade to move downwardly from the position shown in Figure 4 to the position shown in Figures 1 and 5 whereby the blade will move through the slot 21 and the teeth 22 will crack the egg in the socket member 20. An intermediate portion 31 of the flange 12 is bent downwardly, and the intermediate curved portion 31 coacts with the upstanding bearings 14 to provide a support for the pin 15.

From the foregoing it is apparent that an egg cracking device has been provided which is especially useful in the kitchen. Eggs have always presented a problem in opening and previously eggs have been opened by hitting them with a knife or any other handy object or hitting them on the edge of a frying pan, mixing bowl, on the edge of the stove or table or other inconvenient ways. Since egg shells vary in thickness and in strength it is difficult to judge just how hard to hit them, but all of these methods often result in crushing the shell too much to cause particles to drop into the mix or frying pan or breaking the yoke. If the egg is not perfectly fresh the sudden jar will cause the yoke to mix with the white and what is more provoking is the messy drip from the point of breaking to the mixing bowl or stove. With the present invention there is provided a stationary egg breaking device which can be located in a spot convenient to the stove or work table and eggs can be cracked readily without looking around for something to crack the egg on and all of the aforementioned disadvantages will be overcome. The various parts can be easily cleaned or wiped and the device is of a simple, sanitary and attractive design and it can be economically constructed by stamping or casting from steel, copper, aluminum, brass or any alloy or metal desired. Further, it can be made of plastics or any transparent material.

In the construction shown in Figures 1 through 5 the slot 21 is cut across the center of the egg shaped socket 20 through which the knife 16 works to come in contact with the egg. In operation, the saw toothed knife 16 is raised by the convenient handle 23 and there is the stop 26 which prevents the knife from being raised too high. Then, the egg is held in the other hand lightly but firmly underneath and up into the socket 20. Then, the knife 16 is turned loose and the spring 29 will cause the knife to snap against the body letting only the saw teeth 22 stick through far enough to prick the shell and inner lining of the egg about one-third of the way around. It will be noted that the crack is on the top of the egg thus preventing the drip and the egg always comes apart in the center which aids the cook in pouring the yoke from one half to the other in separating the yoke from the white which is a practice that many cooks still like to do.

I claim:

1. An egg cracking device comprising a body member provided with a vertically disposed base adapted to be secured to a supporting structure, a horizontally disposed flange extending from said base and provided with a horizontally disposed lip, a curved egg receiving socket positioned inwardly of said lip, said body member being provided with a slot, portions of said flange being shaped to provide bearings, a pin extending through said bearings, a blade mounted for movement into and out of engagement with said slot, a spring engaging said blade and pin, a handle on said blade, a plurality of teeth on the lower surface of said blade for engagement with an egg positioned in said socket, the front end of said blade being shaped to provide a shoulder for abuting said lip when the blade is lowered, a portion of said blade being cut away to define a pair of spaced apart stop members for limiting rotation of said blade.

2. In an egg cracking device, a body member provided with a horizontally disposed flange having a horizontally disposed lip, a curved egg receiving socket positioned inwardly of said lip and extending upwardly therefrom, said body member being provided with a slot, portions of said flange being shaped to provide aligned opposed bearings, a pin extending through said bearings, an intermediate portion of said flange being bent downwardly and coacting with said bearings to provide a support for said pin, a blade mounted for movement into and out of engagement with said slot, said blade including a support portion on its rear end provided with an opening, said pin extending through said opening, a spring engaging said blade and pin, there being a notch in said blade for engagement by said spring, a handle on said blade, a plurality of teeth on the lower surface of said blade for engagement with an egg positioned in said socket, said teeth projecting beyond the inner edge of said socket when the blade is in lowered position, the front end of said blade being shaped to provide a shoulder for abutting said lip when the blade is lowered to limit downward movement of said blade, a portion of said blade being cut away to define a pair of spaced apart stop members for limiting rotation of said blade, there being a projection on said body member for engagement by said stop members.

References Cited in the file of this patent

UNITED STATES PATENTS

| | | |
|---|---|---|
| 562,605 | Hedberg | June 23, 1896 |
| 808,507 | Blue | Dec. 26, 1905 |
| 875,419 | Fleischmann | Dec. 31, 1907 |
| 1,865,619 | Dammrich | July 5, 1932 |
| 1,870,741 | Nastrom | Aug. 9, 1932 |
| 1,925,405 | Regensburger | Sept. 5, 1933 |

FOREIGN PATENTS

| | | |
|---|---|---|
| 456,231 | France | June 13, 1913 |